Figure 1:
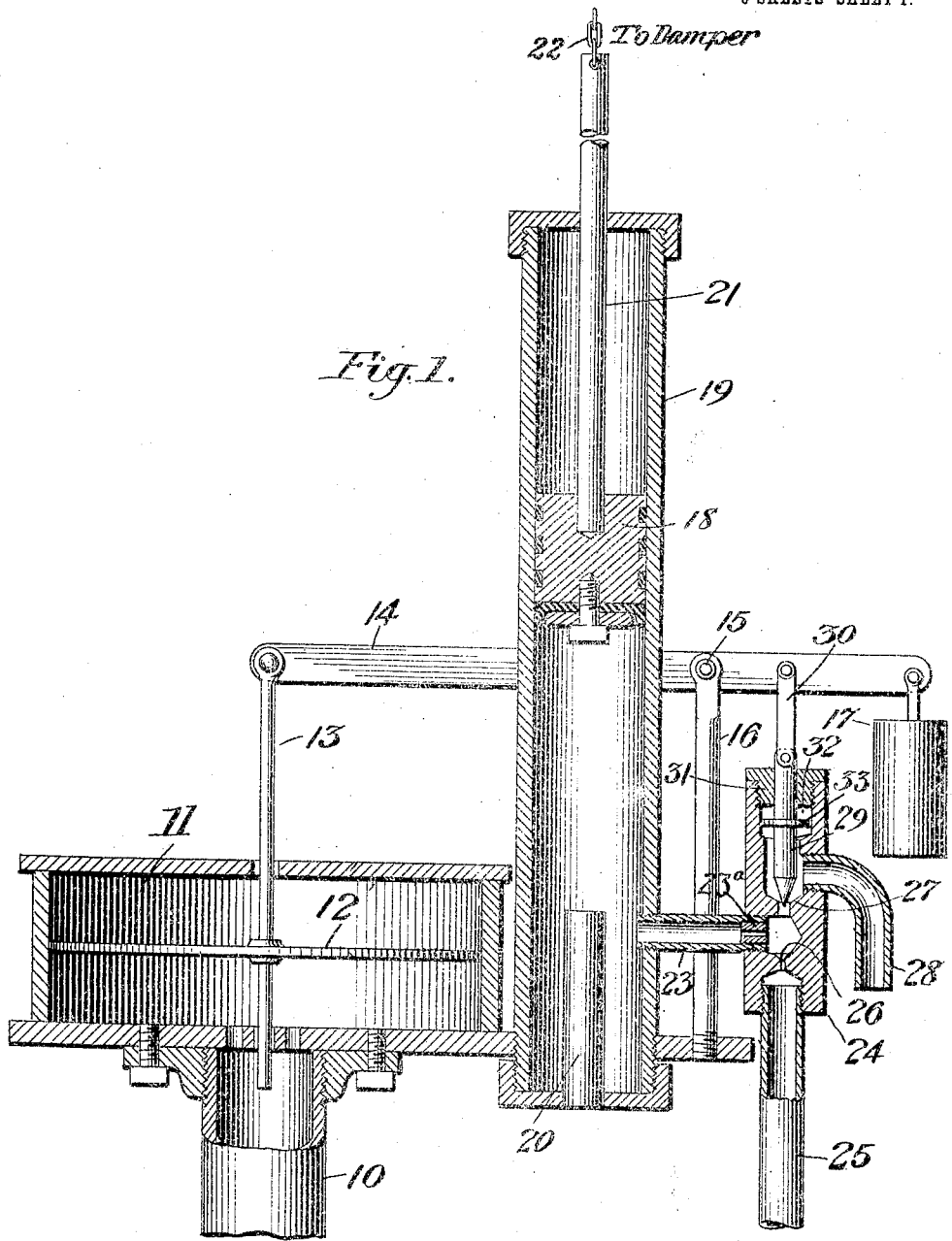

O. E. WILLIAMS.
REGULATOR FOR DAMPERS AND THE LIKE.
APPLICATION FILED JUNE 4, 1910.

1,046,922.

Patented Dec. 10, 1912.

3 SHEETS—SHEET 1.

Witnesses.

Inventor:

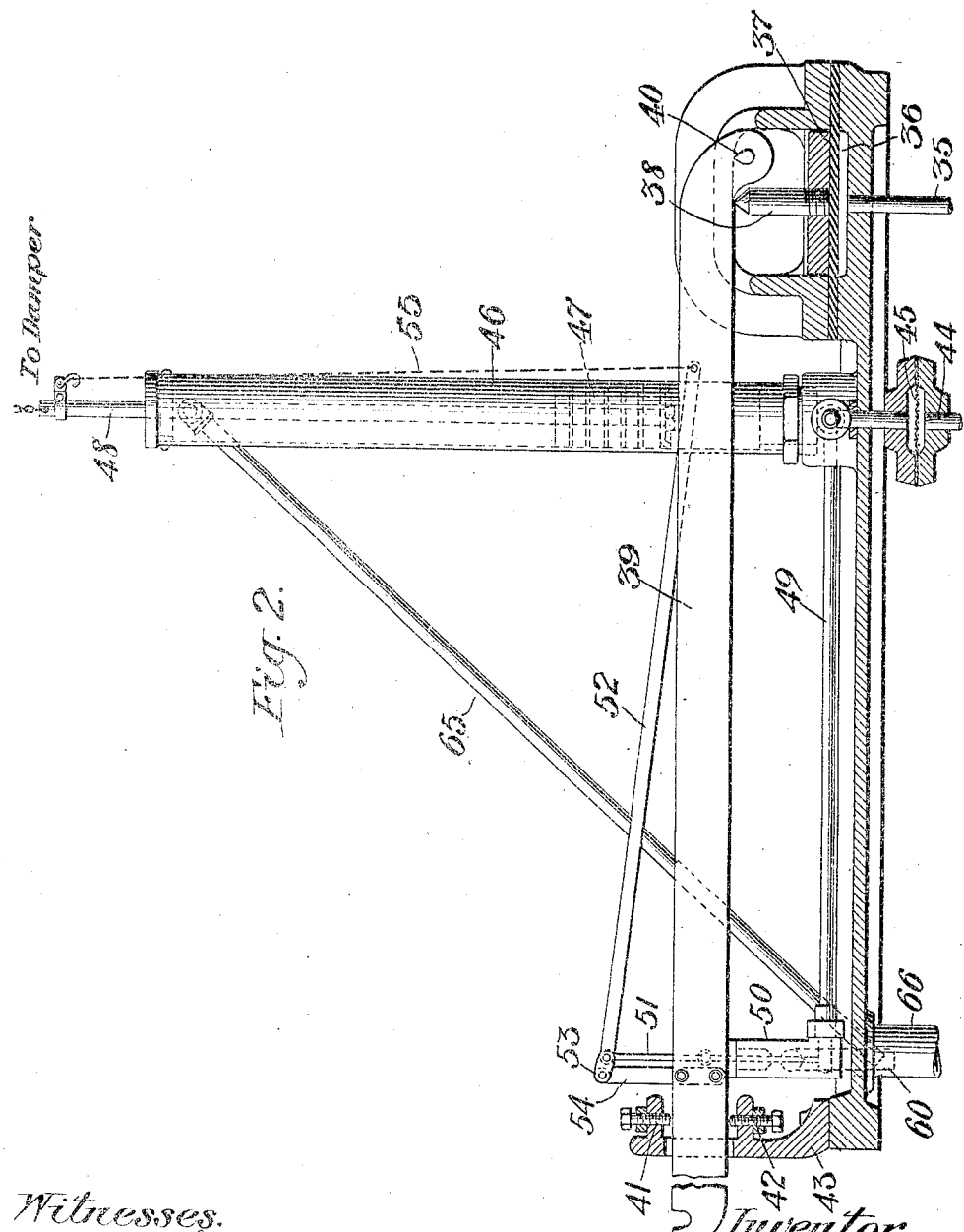

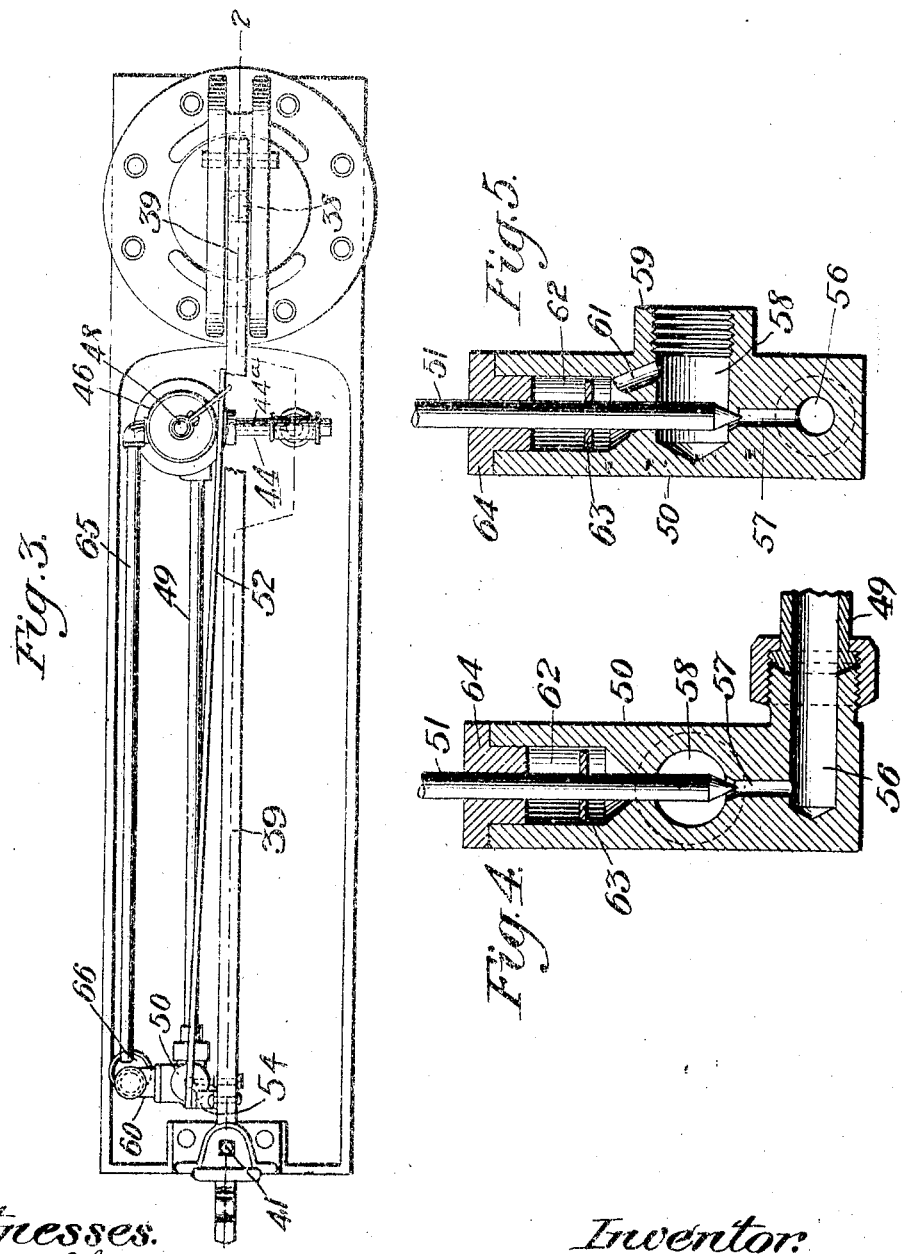

UNITED STATES PATENT OFFICE.

OSBERT E. WILLIAMS, OF SCRANTON, PENNSYLVANIA.

REGULATOR FOR DAMPERS AND THE LIKE.

1,046,922.

Specification of Letters Patent. Patented Dec. 10, 1912.

Application filed June 4, 1910. Serial No. 564,975.

*To all whom it may concern:*

Be it known that I, OSBERT E. WILLIAMS, a citizen of the United States, and resident of Scranton, county of Lackawanna, and State of Pennsylvania, have invented certain new and useful Improvements in Regulators for Dampers and the Like; and I do hereby declare the following to be a full, clear, and exact description of the invention, such as will enable others skilled in the art to which it appertains to make and use the same.

This invention relates to improved means for producing a varying fluid pressure on a suitably loaded piston or diaphragm of a regulating device or motor.

The improvements are especially applicable to the regulation of the dampers of steam boilers, the operation of steam valves to control the speed of engines or the amount of steam used in one or more steam actuated blowers, and also for controlling the amount of feed water admitted to a steam boiler. In fact the improved apparatus may be used in connection with many other devices where regulation is required in the flow of fluid or the speed of machinery.

The object of the invention is to provide a device of this kind by which a reliable and effective regulation is produced, the device being positive in its action and at the same time very sensitive to the varying conditions of pressure, water level and the like.

It is also aimed to produce a regulator of simple construction, in which the parts are reduced to a minimum, and in which packing glands, stuffing boxes, and similar instrumentalities, which cause friction and leakage and are also subject to wear, are omitted. The apparatus operates under very small differences of pressure, the construction is durable and the device will wear for a considerable length of time without leakage, the possibility of sticking or failure, or any special attention on the part of the attendant.

In carrying out the invention, I utilize a stream of water or other fluid which is constantly flowing, and I make this stream do the work of regulation by controlling the pressure thereof in a suitable manner, the pressure being built up and relieved in accordance with the regulating effect which is to be produced. In practice, the constantly flowing stream of fluid is regulated in its passage by means of a needle valve or the like, which is controlled from a steam pressure device, for example, in connection with a boiler, whereby the pressure of the liquid on a suitable diaphragm or piston connected with the part to be controlled, such as a damper, is increased and decreased as called for by conditions. In this way, the stream of fluid is made to do useful work, and the device is rendered very sensitive, so that it will respond rapidly to the smallest variation requiring regulation.

In the accompanying drawing:—Figure 1 is a vertical section of an apparatus embodying the invention, showing the same in connection with the damper of a steam boiler. Fig. 2 is a vertical section taken on the line 2—2 of Fig. 3, the actuating lever being shown in elevation. Fig. 3 is a top plan view of a modified form of the apparatus showing it used for the same purpose. Figs. 4 and 5 are detailed sections of the valve chamber and its needle valve.

The apparatus shown in Fig. 1 is designed to regulate the position of a damper in a boiler off-take flue or to regulate a steam valve controlling the speed of a fan, steam driven, taking off the products of combustion by means of the varying pressure of the said products of combustion. A part of these products of combustion is conducted through a suitable flue 10 into a pressure chamber 11, in which a piston 12 is movable. The piston rod 13, on which the piston is mounted, is connected with a counterbalanced beam 14 fulcrumed at 15 on a suitable fixed support such as the standard 16. In the embodiment illustrated the beam 14 is counterweighted by means of a weight 17 depending from the end of said beam that is opposite the piston rod 13. The damper or other device to be regulated is operated by means of a piston 18 working up and down in a cylinder 19 to contain pressure water or similar fluid, as will hereinafter appear, and said piston 18 is loaded or weighted so that it will normally take a position in the lower part of its cylinder, where it is supported on a suitable abutment 20. Said piston is provided with a piston rod 21 connected by means of a chain 22 with the damper, engine throttle or blower control valve (not shown).

The cylinder 19 is supplied with water or other fluid by means of a short pipe 23 having a restricted opening 23ª and leading from a valve casing 24, into which the water flows constantly from a supply pipe 25. The water flows from the supply pipe 25 through a restricted opening 26 formed in the valve casing 24 between the adjacent ends of the pipes 23 and 25, as shown, or embodied in water supply pipe 25, and it may then pass through the pipe 23 directly into the hydraulic cylinder, where it will act upon the piston 18 and raise the same to a certain extent. The water entering the valve casing 24 also passes up through a conical valve seat 27 formed in said casing above the inlet to the pipe 23, and from said conical valve seat the water may flow out of the valve casing through an overflow pipe 28 which is preferably attached to the side wall of the valve casing, as shown. The opening through the conical valve seat 27 is controlled by means of a needle valve 29 carried by the beam 14 and movable thereby. Said needle valve is preferably suspended from said beam by means of a link 30, and it passes through a bushing 31 screwed into the upper open end of the valve casing 24. Immediately below the bushing or plug 31 the valve casing is provided with a small chamber 32, within which the needle valve 29 is provided with a small baffle 33.

The operation of the apparatus is essentially as follows:—The escaping products of combustion pass into the pressure chamber 11 and there act on the diaphragm or piston 12, which moves the beam or lever 14 upward or downward in accordance with the pressure existing in said pressure chamber. As the pressure produced by the products of combustion fluctuates, there is a corresponding movement of the beam or lever 14 on its fulcrum 15, which causes the needle to be moved correspondingly in the valve casing 24. The pipe 25, as before intimated, is supplied with a constantly flowing stream of water or other fluid discharging to atmospheric pressure, and a portion of this water or fluid passes into or out of the cylinder 19, where it acts upon the piston 18 which is connected with the damper, and it also passes out of the valve casing 24 through the overflow pipe 28. The needle valve 29 is so arranged that under operating conditions, it does not close the conical valve seat or passage 27, but in its intermittent upward and downward movement it restricts this passage more or less so that differences of pressure are produced in the valve casing and in the cylinder 19. Supposing that the pressure of the products of combustion leaving the furnace being regulated is reduced too much so that the damper should be partially closed; the piston 12 will be allowed to descend correspondingly against the reduced pressure of the gases in the chamber 11, carrying down that end of the lever or beam 14 and thereby effecting the raising of the opposite end and of the needle valve 29. This will move the needle valve away from its passage 27 and permit the water in the valve casing, which is now impeded to a less extent, to exhaust more freely through the overflow 28, with the result that the pressure in the motor cylinder 19 will be relieved so that the damper controlling piston 18 may drop down to a certain extent which produces a partial closing of the damper. This operation will, of course, check the flow of gas from the boiler, furnace, or out-take, and tend to raise the pressure of the products of combustion to normal. Then in a short time the conditions may require that the damper be opened again to a certain extent at least; this will be effected by the increased pressure of the products of combustion due to accumulation when the damper is partially closed, the pressure of the gases forcing the piston 12 upward again in the pressure chamber and causing the needle valve 29 to be correspondingly lowered in the direction of its seat or passage. Now, of course, there is further impeding or restriction of the water exhausting to atmosphere, due to the lowering of the needle valve, and accordingly the pressure in the valve casing between the passages 26 and 27 will be considerably increased thereby causing a further quantity of water to pass into the cylinder 19 at increased pressure, so that the piston 18 moves upward and opens the damper farther. This opening of the damper causes the products of combustion to escape more freely from the furnace, thus lowering the pressure therein to its normal value, and allowing the piston 12 to descend in its chamber 11 and effect the closing of the damper to the extent required. This apparatus may be used for the regulation of pressure of air or gas where the pressure is low, either above or below that of the atmosphere. In this way, an intermittent opening and closing of the damper takes place repeatedly as called for by conditions, and a sensitive and reliable regulation is attained.

The post or abutment 20 in the lower part of the cylinder 19 serves as a stop for the piston 18 and limits the downward movement of the latter at such a point that the water or other fluid cannot pass into said cylinder in the space above said piston. The small baffle 33 on the needle valve serves to deflect the rising water in a downward direction so that it will pass out of the overflow and will not leak out of the upper end of the valve casing. The restricted opening 23$^a$ in the inlet 23 of the motor cylinder is for the purpose of preventing the piston being moved too suddenly by the increase of pressure in the valve casing, as will be understood.

In addition to the sensitiveness of the device, it is of very simple construction and it has the great advantage that it operates under very small differences of pressure. Another advantage is that the needle valve need never be completely closed, so that sticking of this valve is made impossible. In other devices of this kind, the sticking of the valve has been one of the prime factors in precluding a sensitive and reliable regulation, but this is not the case in the present instance.

Instead of having the water or other fluid pass from the valve casing into the motor cylinder, it may pass into such cylinder first and then into the valve casing. An arrangement of this kind is illustrated in Figs. 2 to 5 inclusive. In the apparatus shown in these views, the needle valve is actuated by steam pressure instead of by the pressure of the gases of combustion. A pipe 35, leading from a steam connection on the boiler whose damper is to be regulated, introduces steam pressure into a chamber 36, where such pressure acts upon a diaphragm 37 having a pin 38 bearing up against a counterweighted beam or lever 39. This lever is pivoted at 40, and it is moved on its pivot by the varying steam pressure beneath the diaphragm 37, as will be understood, the movement of said lever in opposite directions being limited by means of stops 41, 42, carried by a bracket 43 which embraces and guides the lever near its end opposite the pivot 40. The constantly flowing stream of water passes, by means of a pipe 44 having a strainer 45, through the restricted passage 44ª, Fig. 3 into the motor cylinder 46, at the lower part of the latter, said cylinder having a piston 47, piston rod 48 and a bottom outlet pipe 49. The piston rod 48 is connected in any suitable way with the damper, steam valve or other device, as before. The outlet pipe 49 of the motor cylinder leads to a valve casing 50 in which operates a needle valve 51 carried by the controlling lever 39. In this instance, the needle valve is not carried directly by said lever but is mounted on an auxiliary lever 52 which is pivoted at 53 on a small post 54 extending upward from the main lever, as shown. The opposite end of the auxiliary lever 52 is suspended by means of a chain 55 from the upper part of the piston rod 48.

The valve casing 50 and needle valve 51 are shown in detail in Figs. 4 and 5, wherein it appears that the pipe 49 connecting the motor cylinder with the valve casing communicates with an inlet passage 56 in the lower part of the valve casing. Leading upward from this inlet passage is a small channel 57 of relatively restricted cross section, and this channel debouches into a chamber 58 in communication with an overflow pipe 60, as shown in Fig. 3. Above the chamber 58 and communicating with it by means of a small passage 61 is a chamber 62 in the upper part of the valve casing, in which chamber the needle valve is provided with a baffle 63, similar to that previously described. The top of the valve casing is closed by a plug 64 through which the needle valve works in a vertical direction.

Leading off from the upper end of the motor cylinder 46 is a water leakage pipe 65 which discharges into an overflow pipe 66 into which the overflow pipe 60 of the valve casing likewise discharges, as shown in Figs. 2 and 3. This leakage pipe takes care of any water which finds its way into the part of the motor cylinder above the piston thereof, such water being expelled by the piston when the latter moves into the upper end of the motor cylinder, and flowing out of the pipe 65 into the overflow pipe.

It is to be understood that the constantly flowing stream of water passes, by means of the pipe 44, into the motor cylinder 46, in which it maintains such a level that the damper-controlling piston is maintained at a corresponding height. In other words, a certain amount of pressure is built up in the lower part of the motor cylinder, such water being carried off, however, by means of the connecting pipe 49, which conducts it into the valve casing 50. Supposing that the steam pressure is too great, so that the damper should be closed to a certain extent, the diaphragm 37 will force the lever or beam 39 in an upward direction on its pivot 40. This, of course, will carry the auxiliary lever 52 in an upward direction and thereby raise the needle valve 51, so that the pressure of the water in the valve casing will be relieved, and a freer exit of the water through the overflow pipe 60 will be permitted. In this way the pressure in the lower part of the motor cylinder, which is dependent on the constriction of the opening in the valve casing, is relieved to a certain extent, so that the piston 47 may drop down and thereby close the damper. This closing movement of the damper would be too sudden and the damper would be moved too far if it were not for the arrangement of the needle valve on the auxiliary lever in the manner described. In descending in the motor cylinder, the piston 47 permits the end of the auxiliary lever to drop to a corresponding extent, through the chain connection described, and this downward movement of the auxiliary lever will move the needle valve 51 down in the direction of its seat, so that it will not be permanently moved too far away from the same. In other words, the opening of the needle valve, which would be apt to be too great, is neutralized to a certain extent by the auxiliary lever and the aforesaid connection. As soon as the steam pressure decreases, the diaphragm 37 will descend and thereby permit the counterweighted lever 39 to move downward about its pivot, so that the needle valve will be caused to restrict the flow of water to a greater extent, thus building up pressure in the motor cylinder again, and effecting the raising of the piston and the opening of the damper to the extent required. It is to be understood that in this case also, the needle valve does not at any time make a tight contact with its seat, as the discharge of water is continuous, although varying in amount. The baffle 63 acts in the manner previously explained, and the small passage 61 permits the draining off of the water from the chamber in the upper part of the valve casing. Although the quantity of water or other fluid used need be very small, still a large pressure can be built up under the piston or other moving element.

The restricted passage under the valve is important in both of the embodiments described, since if it were not for this restriction the needle valve, when it moves away from its seat, would not be able to relieve the pressure under the loaded piston unless the quantity of water flowing was very small. Of course, it is necessary that the constantly flowing stream be constant in volume or nearly so. If the conditions described are obtained, the device is made extremely sensitive, and it responds with remarkable promptness to the smallest variation requiring regulation.

In both embodiments of the invention shown in the drawing the conducting means for the constantly flowing stream of incoming fluid is of small cross sectional area adjacent its connection with the fluid pressure device, in order that the communication with the latter may be somewhat restricted so as to prevent a sudden and direct transmission of the pressure in the motor device to the stream of fluid on its way from the source of supply to the motor device.

As above intimated, it is to be understood that the improvements are capable of various applications, and of course I have not attempted to describe the numerous modifications that may be adopted without digressing from my inventive idea. So far as the broader aspects of the invention are concerned, the character of the controlling means, the device to be controlled, and of the fluid-operated or regulating device is capable of wide variation.

What I claim is:—

1. The combination of a fluid pressure regulating device adapted to operate a damper or the like, conducting means for a constantly flowing stream of fluid, having constant but restricted communication with said device, means to discharge such stream of fluid constantly, means to restrict the discharge of the fluid to varying degrees and thereby build up and relieve pressure in said regulating device, and means to operate said restricting means in accordance with conditions independent of the pressure of such fluid.

2. The combination of a fluid pressure regulating device adapted to operate a damper or the like, conducting means for a constantly flowing stream of fluid, having normally uninterrupted but restricted communication with said device, means communicating with said conducting means and intended to discharge such fluid constantly during operation, a valve associated with said last named means and acting to restrict the discharge of fluid to varying degrees and thereby build up and relieve pressure in said regulating device, and means to operate said valve.

3. The combination of a fluid pressure regulating device, conducting means for a constantly flowing stream of fluid, having uninterrupted but restricted communication with said device, means from which the fluid is discharged in a constantly flowing stream, and means to restrict and relieve the fluid discharge as called for by certain conditions, without total stoppage, whereby the pressure in said regulating device is increased and decreased correspondingly.

4. The combination of a regulating device comprising a cylinder and piston, conducting means for a constantly flowing stream of fluid, in constant but restricted communication with said cylinder, means to discharge such fluid constantly, and a discharge restricting valve operated under certain conditions to restrict and relieve the discharge of fluid and thereby build up and relieve the pressure in said cylinder.

5. The combination of a fluid pressure motor device, connections for a constantly flowing stream of fluid, having constant but restricted communication with said device, means to discharge fluid from the apparatus in a constantly flowing stream, and a valve operated automatically as called for by conditions independent of the pressure of such fluid, and acting to restrict and relieve the discharging fluid, whereby the pressure in said motor device is altered in accordance with such conditions.

6. The combination of a fluid pressure motor device, connections for a constantly flowing stream of fluid, comprising conducting means having constant but restricted communication with said motor device and also including a valve casing having restricted communication with said device, the fluid being discharged from said casing in a constantly flowing stream, a flow restricting valve in said casing, and means to operate said valve automatically.

7. The combination of a valve, a fluid pressure regulating device in which pressure is built up by a constantly flowing stream of fluid in continuous but restricted communication with said device, the flow of such fluid being more or less impeded, without total stoppage, by said valve in order to alter the pressure in said device, and means to actuate said valve automatically as called for by conditions independent of the pressure of such fluid.

In testimony whereof I affix my signature, in presence of two witnesses.

OSBERT E. WILLIAMS.

Witnesses:
   ALMA M. LOVERING,
   HUGH B. ANDREWS.